May 9, 1933.    L. LA RUE ET AL    1,908,031
APPARATUS FOR HANDLING AND DISPENSING LOOSE MILK
Filed Jan. 2, 1932    2 Sheets-Sheet 1
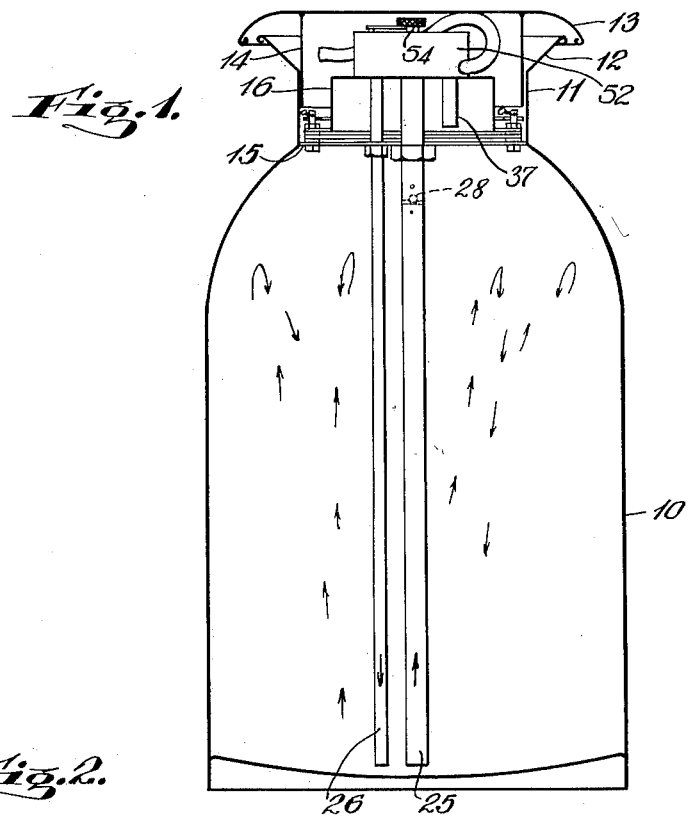
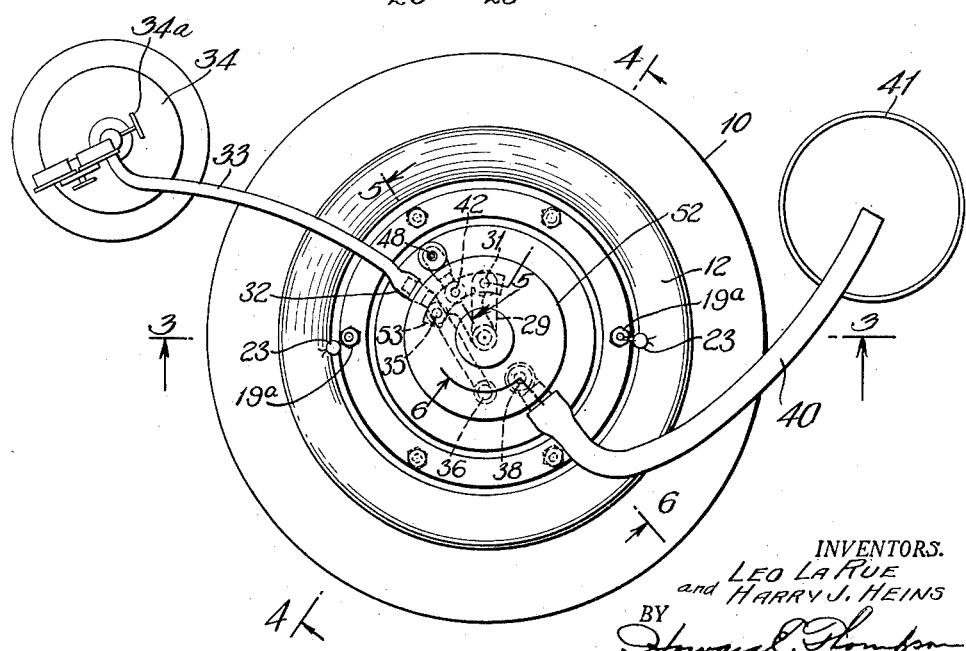
INVENTORS.
LEO LA RUE
and HARRY J. HEINS
BY
ATTORNEY

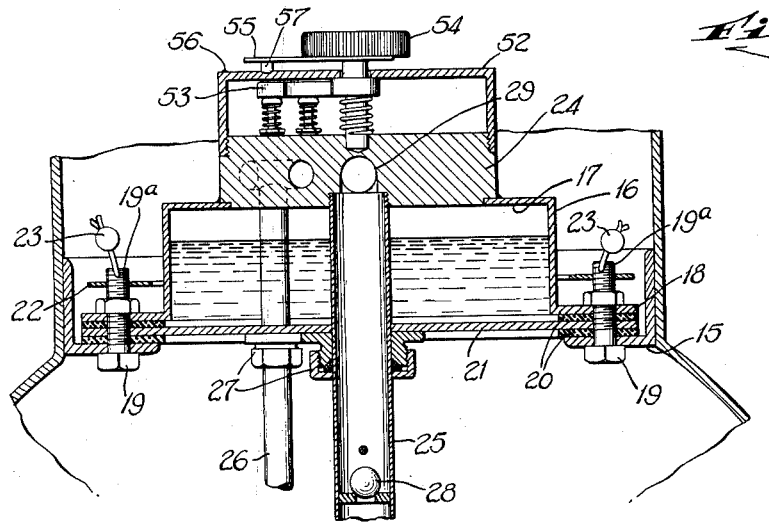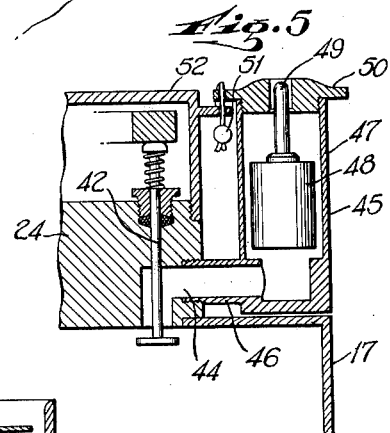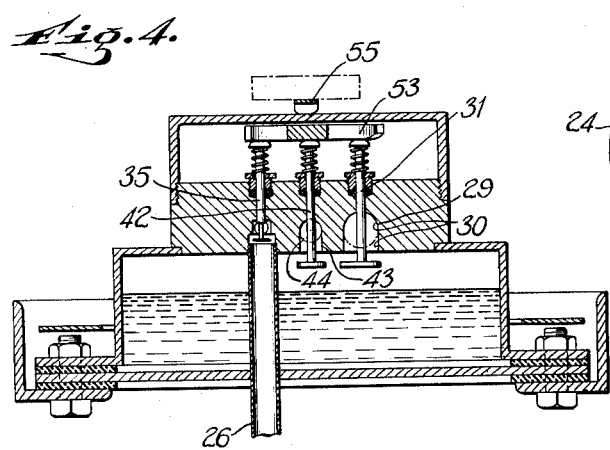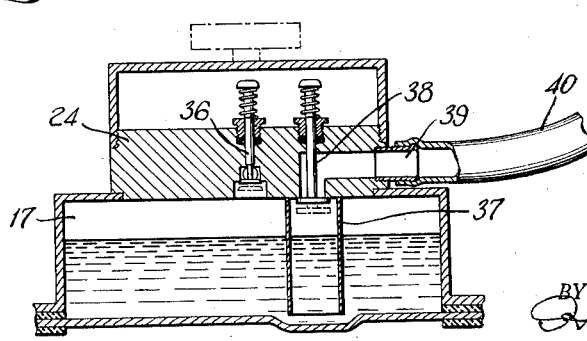

Patented May 9, 1933

1,908,031

UNITED STATES PATENT OFFICE

LEO LA RUE AND HARRY J. HEINS, OF JERSEY CITY, NEW JERSEY

APPARATUS FOR HANDLING AND DISPENSING LOOSE MILK

Application filed January 2, 1932. Serial No. 584,422.

This invention relates to the merchandising of what is known as loose milk, commonly shipped from the dairy in large milk cans, and particularly to the provision of a novel method and apparatus for sealing cans of the class under consideration during shipment and the dispensing of the contents thereof, and providing means constituting part of the seal for dispensing the contents thereof; and the object of the invention is to provide an apparatus of the class described in the form of a unit attachable and detachable with respect to a milk can of more or less conventional form, said unit including means by which the fluid contents of the can may be discharged; a further object being to provide means for measuring a predetermined quantity of the fluid prior to discharging the same from the container; a further object being to provide means for introducing a gas or air into the container in the operation of discharging the contents therefrom and also for the purpose of agitating and mixing the contents; a still further object being to provide means for sealing the attachment to the can so as to prevent the removal thereof and also to prevent the possibility of refilling the container; and with these and other objects in view, the invention consists in an apparatus of the class and for the purpose specified, which is simple in construction, efficient in use, and which is constructed as hereinafter described and claimed.

The invention is fully disclosed in the following specification, of which the accompanying drawings form a part, in which the separate parts of our improvement are designated by suitable reference characters in each of the views, and in which:

Fig. 1 is a diagrammatic, sectional view through a milk can, showing our dispensing and sealing attachment mounted in connection therewith.

Fig. 2 is a plan view of the container with the cover removed, illustrating the method of use of the apparatus.

Fig. 3 is an enlarged, sectional view through the upper end portion of the container and the attachment mounted thereto, the section being on the line 3—3 of Fig. 2.

Fig. 4 is a broken section on the line 4—4 of Fig. 2, taken through a series of three valves employed.

Fig. 5 is a partial section on the line 5—5 of Fig. 2; and,

Fig. 6 is a broken section on the line 6—6 of Fig. 2.

For the purpose of illustrating one method of carrying our invention into effect, we have shown the same applied to a milk can 10, which is diagrammatically illustrated in Figs. 1 and 2 of the drawings. This can is substantially of the conventional form employed in shipping and selling large volumes of loose milk, the can or container having a projecting neck portion 11 with a flared outer end 12, over which the usual cover 13 is mounted, the latter having a sleeve portion 14, fitting snugly in the neck 11.

In the construction shown, we provide the lower part of the neck with a supporting ring 15, L-shaped in cross sectional form to provide means for mounting our improved seal and dispensing unit 16 in connection therewith. It will be understood, however, that other means of attaching and mounting the unit in connection with the can may be provided.

The unit, in the construction shown, consists of a measuring tank 17, having at its lower end, an outwardly projecting flange 18, which seats upon and is coupled to the supporting ring 15 by a plurality of bolts 19, suitable packing gaskets 20 being employed between the flange 18 and the bottom plate or wall 21 of the container 17 and the ring 15, as clearly seen in Fig. 3 of the drawings. Two of the bolts 19 are longer than the others to provide projecting ends 19a adapted to pass through a seal ring 22 disposed above the nuts of all of the bolts to prevent removal of the unit 16 from the container, the same being sealed in place by seals 23 passed through the projecting ends 19a, as clearly seen in Fig. 3 of the drawings.

The upper end of the measuring tank 17 has a reduced, projecting valve body 24, in which a plurality of valves are mounted. Attached to this body are two depending tubes 25 and 26, leading to the bottom of the can or container 10, as indicated in Fig. 1 of the drawings, said tubes passing through the plate 21 of stuffing boxes 27 constituting part of the plate to seal the tubes so as to prevent air or gas from passing from the chamber of the can into the tank 17. The tube 25 constitutes a milk discharge tube and has a ball check valve 28 therein, preventing back flow of the milk or the refilling of the can. The upper end of the tube communicates with a transverse port 29 in the body 24, which opens into the tank 17 through an aperture 30 controlled by a valve 31. The tube 26 constitutes a gas or air inlet tube, the upper end of said tube communicating with an inlet nozzle 32, controlling the supply of gas or air to a flexible tube 33 coupled with a supply tank 34 of oxygen or compressed air as may be desired. A valve 35 is employed to control the discharge of gas or air downwardly through the tube 26. Another valve 36 is employed in the body 24 in spaced relation to the valve 35 to control the supply of gas or air to the top of the tank 17 to discharge the milk therefrom through a supplemental discharge tube 37, the vertical dimensions of said tube governing the amount of milk discharged from a tank of predetermined size. A valve 38 controls the discharge of milk through the tube 37 and a nozzle 39 in communication with the valve and a flexible tube 40 which leads to a suitable receiving receptacle 41.

The valves 31 and 35 are arranged adjacent each other, and a vent valve 42 is disposed therebetween, the latter controlling a port 43 opening into the tank 17, the port 43 opening outwardly through the body 24 in a passage 44. A vent and float check device 45 is coupled with the body 24 and includes a pipe 46 in communication with the passage 44 and an upwardly extending tubular body 47 in which a float 48 is mounted, the float including a gage rod 49 projecting through a cap 50 at the top of the attachment. The cap 50 is secured against displacement by a seal 51 which also passes through a box-shaped casing 52 mounted upon the body 24 and enclosing the protruding ends of the several valves 31, 35, 36, 38 and 42 as well as a cam 53 arranged within the casing to actuate said valves. A cam operating knob 54 is rotatably mounted in the central top wall of the casing 52 and projects thereabove and includes an indicating finger 55 movable with respect to suitable markings 56 on the upper surface of the casing to indicate to the operator the off stage, when the entire valve mechanism is inoperative; the mixture and measuring stage, which agitates the milk and discharges the same into the tank 17; and the delivery stage, at which time, the milk in the tank is discharged through the tube 40. A ball or other device 57 may be employed on the indicator 55 to frictionally support the same in the different positions above referred to.

The operation of our improved apparatus will be readily understood from the foregoing description when taken in connection with the accompanying drawings and the following statement. It will first be understood that the milk will be placed in the can 10 and the can sealed by the unit 16, which is secured in position in the manner hereinbefore stated, the unit being such as to fit within the usual cover 13 of the container. When the can is in the process of shipment, the cam will be out of engagement with the several valves employed with the indicator 55 in the "off" position.

When the can reaches the retail dealer, the cover 13 is removed, the flexible tube 33 from the compressed air or oxygen tank 34 is coupled with the nozzle 32 and the apparatus is now ready for use. At this time, it will be understood that the tank 17 may be of a quart or pint capacity. For the purpose of illustration, we will say that this tank is of a pint capacity. In desiring to discharge a pint of the milk from the can 10, the knob 54 is rotated to bring the indicator 55 into position designated as mixture and measure, in which position, the cam 53 engages and depresses the valves 31, 35 and 42 to open all of said valves, thus admitting the air or oxygen into the tube 26 so as to pass upwardly through the milk to agitate the same, causing the milk and cream to be mixed. At the same time, the milk is discharged through the tube 25 into the tank 17 through the port 30 controlled by the valve 31, the air being discharged from the tank through the vent passage 43 controlled by the valve 42.

As the milk raises in the tank 17, it will also pass through the aperture 43 into the device 45 to raise the float 48 and the gage finger 49 thereof, the float 48 engaging the cap 50 to act as a valve, stopping the further admission of milk into the tank 17. At this time, the knob 54 is rotated to release all of the valves and cause the same to be seated by the springs employed thereon, and the knob is rotated until the cam 53 engages the valves 36 and 38 and causes the same to be opened, which constitutes the delivery position of the device. In this position, air or oxygen from the supply 34 will be discharged into the upper end of the tank 17 through the passage controlled by the valve 36 to force the milk from said tank and the tube 40 into a suitable receiver 41. In this connection, it will be understood that the knob 54 may be rotated to shut off the discharge of milk at any time, so that any desired proportionate amount of the milk in the tank 17 may be discharged. The same regulation may be performed by operating a valve 34a on the air or oxygen tank 34 to control the supply of the air or oxygen to the tank 17.

When all of the milk has been discharged from the tank 17, the knob 54 is moved into the off position, which closes all of the valves 31, 35, 42, 36 and 38. It will be understood that the tank 17 may be again refilled by proceeding as above set out, and in like manner, the milk discharged therefrom.

It will be understood that while we have shown our invention as applied to a milk can, the same is not necessarily limited to this specific use, nor is our invention limited to the positive securing and sealing of the attachment to the can, as in some instances, it may be desirable to have the unit quickly attachable and detachable with respect to the can, so that one unit may be used in conjunction with a number of cans. For example, if one retailer should sell during a day, four or five large cans of milk, he could be supplied with one of the units, which would be suitable for use in connection with all of the cans, the unit being cleaned from day to day, so as to maintain the same in a sanitary state at all times. One of the distinctive features of our invention resides in the sanitary handling and dispensing of what is known as loose milk.

It will also be understood, that while we have shown certain details of construction for controlling and regulating the discharge of the fluid contents of a container from the container for supply, that our invention is not necessarily limited to these details, and various other changes in and modifications of the construction herein shown and described may be made within the scope of the appended claims, without departing from the spirit of our invention or sacrificing its advantages.

Having fully described our invention, what we claim as new and desire to secure by Letters Patent, is:

1. The combination with a milk container of the class described, of means for intermittently discharging predetermined quantities of the milk therefrom and for measuring the quantities so discharged, said means comprising a unit attachable and detachable with respect to the container and having an air tight connection therewith, means for sealing the unit against displacement from the container, and means for preventing the refilling of the container through said unit.

2. The combination with a conventional milk can of a dispensing unit secured within and to the can, said unit having a measuring tank for measuring a predetermined amount of the milk to be discharged therefrom, manually operated means for introducing an element into the can to agitate the milk therein and to discharge the same from the can into said tank, and means involving said first named means for discharging the milk from said tank into a suitable receiver disposed outwardly of the can.

3. The combination with a conventional milk can, of a dispensing unit secured within and to the can, said unit having a measuring tank for measuring a predetermined amount of the milk to be discharged therefrom, manually operated means for introducing an element into the can to agitate the milk therein and to discharge the same from the can into said tank, means involving said first named means for discharging the milk from said tank into a suitable receiver disposed outwardly of the can, and a float check device for regulating the amount of milk introduced into said tank.

4. The combination with a conventional milk can, of a dispensing unit secured within and to the can, said unit having a measuring tank for measuring a predetermined amount of the milk to be discharged therefrom, manually operated means for introducing an element into the can to agitate the milk therein and to discharge the same from the can into said tank, means involving said first named means for discharging the milk from said tank into a suitable receiver disposed outwardly of the can, a float check device for regulating the amount of milk introduced into said tank, and a vent valve controlling the discharge of air from said tank in the operation of filling the same.

5. The combination with a conventional milk can, of a dispensing unit secured within and to the can, said unit having a measuring tank for measuring a predetermined amount of the milk to be discharged therefrom, manually operated means for introducing an element into the can to agitate the milk therein and to discharge the same from the can into said tank, means involving said first named means for discharging the milk from said tank into a suitable receiver disposed outwardly of the can, a float check device for regulating the amount of milk introduced into said tank, a vent valve controlling the discharge of air from said tank in the operation of filling the same, and means for securing and sealing the unit in connection with said can.

6. A fluid dispensing unit of the class described comprising a tank, means for mounting the tank in connection with a suitable support, two tubes projecting through one side wall of the tank, one of said tubes constituting a pressure element supply tube and the other a fluid discharge tube, said tubes being adapted to be placed in the fluid to be discharged through said unit, means including manually actuated valves controlling ports opening into said tank for introducing a pressure element into the pressure tube and for discharging the fluid from said fluid tube into the tank of said unit, and other valves operated independently of said first named valves for admitting a pressure element into said tank and for discharging the fluid from the tank through a discharge passage.

7. A fluid dispensing unit of the class described comprising a tank, means for mounting the tank in connection with a suitable support, two tubes projecting through one side wall of the tank, one of said tubes constituting a pressure element supply tube and the other a fluid discharge tube, said tubes being adapted to be placed in the fluid to be discharged through said unit, means including manually actuated valves controlling ports opening into said tank for introducing a pressure element into the pressure tube and for discharging the fluid from said fluid tube into the tank of said unit, other valves operated independently of said first named valves for admitting a pressure element into said tank and for discharging the fluid from the tank through a discharge passage, and said first named valves including a vent valve permitting the discharge of air from the tank in the operation of filling the same with a fluid.

8. A fluid dispensing unit of the class described comprising a tank, means for mounting the tank in connection with a suitable support, two tubes projecting through one side wall of the tank, one of said tubes constituting a pressure element supply tube and the other a fluid discharge tube, said tubes being adapted to be placed in the fluid to be discharged through said unit, means including manually actuated valves controlling ports opening into said tank for introducing a pressure element into the pressure tube and for discharging the fluid from said fluid tube into the tank of said unit, other valves operated independently of said first named valves for admitting a pressure element into said tank and for discharging the fluid from the tank through a discharge passage, said first named valves including a vent valve permitting the discharge of air from the tank in the operation of filling the same with a fluid, and a float in the vent passage controlled by said last named valve for checking the admission of fluid into said tank.

9. A fluid dispensing unit of the class described comprising a tank, means for mounting the tank in connection with a suitable support, two tubes projecting through one side wall of the tank, one of said tubes constituting a pressure element supply tube and the other a fluid discharge tube, said tubes being adapted to be placed in the fluid to be discharged through said unit, means including manually actuated valves controlling ports opening into said tank for introducing a pressure element into the pressure tube and for discharging the fluid from said fluid tube into the tank of said unit, other valves operated independently of said first named valves for admitting a pressure element into said tank and for discharging the fluid from the tank through a discharge passage, said first named valves including a vent valve permitting the discharge of air from the tank in the operation of filling the same with a fluid, a float in the vent passage controlled by said last named valve for checking the admission of fluid into said tank, and said valves being actuated by a cam manually moved into position to collectively open and close the first and second named groups of valves.

10. The combination with a milk container of conventional form the top of the container having a reduced neck and flared open end and a substantially flat closure cap detachable with respect to the flared open end of the container, of means disposed within the neck and flared end of the container and cap for intermittently discharging predetermined quantities of milk from the container after removing said cap and for measuring the quantity so discharged.

11. The combination with a milk container of conventional form the top of the container having a reduced neck and flared open end and a substantially flat closure cap detachable with respect to the flared open end of the container, of means disposed within the neck and flared end of the container and cap for intermittently discharging predetermined quantities of milk from the container after removing said cap and for measuring the quantity so discharged, said means comprising a unit arranged within the open end of the container and attachable and detachable with respect thereto.

12. A fluid dispensing and measuring unit for fluid containers, said unit being mounted within the boundary walls of the container, means within the container for detachably securing the unit thereto, said unit including a measuring chamber, means including a compressed air supply independent of the unit for discharging predetermined quantities of fluid from the container into said measuring chamber, and means independent of said first named means for discharging the fluid from said measuring chamber to a receiving receptacle.

13. A fluid dispensing and measuring unit for fluid containers, said unit being mounted within the boundary walls of the container, means within the container for detachably securing the unit thereto, said unit including a measuring chamber, means including a compressed air supply independent of the unit for discharging predetermined quantities of fluid from the container into said measuring chamber, and means independent of said first named means for discharging the fluid from said measuring chamber to a receiving receptacle, said first named discharging means including a plurality of valves and a manually operated member for moving said valves into open positions.

14. A fluid dispensing and measuring unit for fluid containers, said unit being mounted within the boundary walls of the container, means within the container for detachably securing the unit thereto, said unit including a measuring chamber, means for discharging predetermined quantities of fluid from the container into said measuring chamber, means independent of said first named means for discharging the fluid from said measuring chamber to a receiving receptacle, said first named discharging means including a plurality of valves and a manually operated member for moving said valves into open positions, and the second named discharging means including valves moved into open position by said manually operated member when out of engagement with said first named valves.

In testimony that we claim the foregoing as our invention we have signed our names this 31st day of December 1931.

LEO LA RUE.
HARRY J. HEINS.